United States Patent
Chin et al.

(10) Patent No.: US 12,445,865 B2
(45) Date of Patent: Oct. 14, 2025

(54) CONVERGED CELLULAR BACKUP COST SAVINGS

(71) Applicant: AT&T Intellectual Property I, L.P., Atlanta, GA (US)

(72) Inventors: Jae-Sun Chin, Garland, TX (US); Jamil Cheikhali, Tampa, FL (US); Barry Elia, King George, VA (US); Gregory Harp, Allen, TX (US); Sridhar Narahari, Milpitas, CA (US); Raghu Mudumbai, Monroe, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 369 days.

(21) Appl. No.: 17/931,709

(22) Filed: Sep. 13, 2022

(65) Prior Publication Data

US 2024/0089750 A1    Mar. 14, 2024

(51) Int. Cl.
*H04W 24/02* (2009.01)

(52) U.S. Cl.
CPC .................. *H04W 24/02* (2013.01)

(58) Field of Classification Search
CPC ..................................... H04W 24/02
USPC .................................... 340/539.19
See application file for complete search history.

(56) References Cited

U.S. PATENT DOCUMENTS

| | | | | |
|---|---|---|---|---|
| 11,012,868 B1* | 5/2021 | Yang | ............ | H04W 24/08 |
| 2011/0194456 A1* | 8/2011 | Fordham | ............ | H04L 41/145 370/254 |
| 2012/0172040 A1* | 7/2012 | Xu | ............ | H04L 63/08 455/435.1 |
| 2014/0286174 A1* | 9/2014 | Iizuka | ............ | H04L 43/12 370/241 |
| 2015/0135320 A1* | 5/2015 | Coskun | ............ | H04L 43/04 726/24 |
| 2015/0333951 A1* | 11/2015 | Yeom | ............ | H04L 67/51 725/95 |
| 2016/0013892 A1* | 1/2016 | Suzuki | ............ | H04L 1/1621 370/328 |
| 2016/0021600 A1* | 1/2016 | Keller | ............ | H04L 45/22 370/329 |
| 2016/0028607 A1* | 1/2016 | Weill | ............ | H04L 61/2503 709/224 |
| 2018/0183662 A1* | 6/2018 | Likar | ............ | H04L 41/0883 |
| 2019/0340168 A1* | 11/2019 | Raman | ............ | G06F 16/27 |
| 2019/0357074 A1* | 11/2019 | Priore | ............ | H04W 28/0236 |
| 2020/0235607 A1* | 7/2020 | Kanarellis | ............ | H04L 41/0661 |
| 2020/0326924 A1* | 10/2020 | A | ............ | H04L 41/12 |
| 2021/0274362 A1* | 9/2021 | Perenda | ............ | H04L 43/0852 |

(Continued)

*Primary Examiner* — Kam Wan Ma
(74) *Attorney, Agent, or Firm* — Guntin & Gust, PLC; Louis Yang

(57) ABSTRACT

An architecture related to notifying user equipment of communication transportation functionality and/or facility shifts between a wired communication transportation framework and a wireless communication transportation framework. A method can comprise determining a decrease in a number of data packets flowing through a wireline network interface over a defined period of time, based on the number of data packets, determining that the wireline network interface is failing, generating a notification comprising a data record comprising a field representing a state associated with the failing wireline network interface, and sending the notification to a user equipment.

20 Claims, 10 Drawing Sheets

(56) References Cited

U.S. PATENT DOCUMENTS

2021/0314664 A1* 10/2021 Tan ...................... H04L 65/765
2023/0198604 A1*  6/2023 Bhamri ................. H04B 7/088
                                                        375/347

* cited by examiner

CONVERGED CELLULAR BACKUP COST SAVINGS

TECHNICAL FIELD

The disclosed subject matter relates to notifying a user equipment (UE) of communication transportation functionality and/or facility shifts between the use of a wired communication transportation framework and a wireless communication transportation framework.

BACKGROUND

In converged wireless/wired network infrastructures provided, for example, by mobile network operator (MNO) entities, a user equipment (UE) can switch and use a wireless communication transportation framework when the primary wireline communication transportation framework becomes unavailable. However, when there is a transport framework switch, for instance, from the primary wireline communication transportation framework to the wireless communication transportation framework, the UE can typically be unaware that a communication transportation framework shift has occurred.

DETAILED DESCRIPTION

Figure 1:
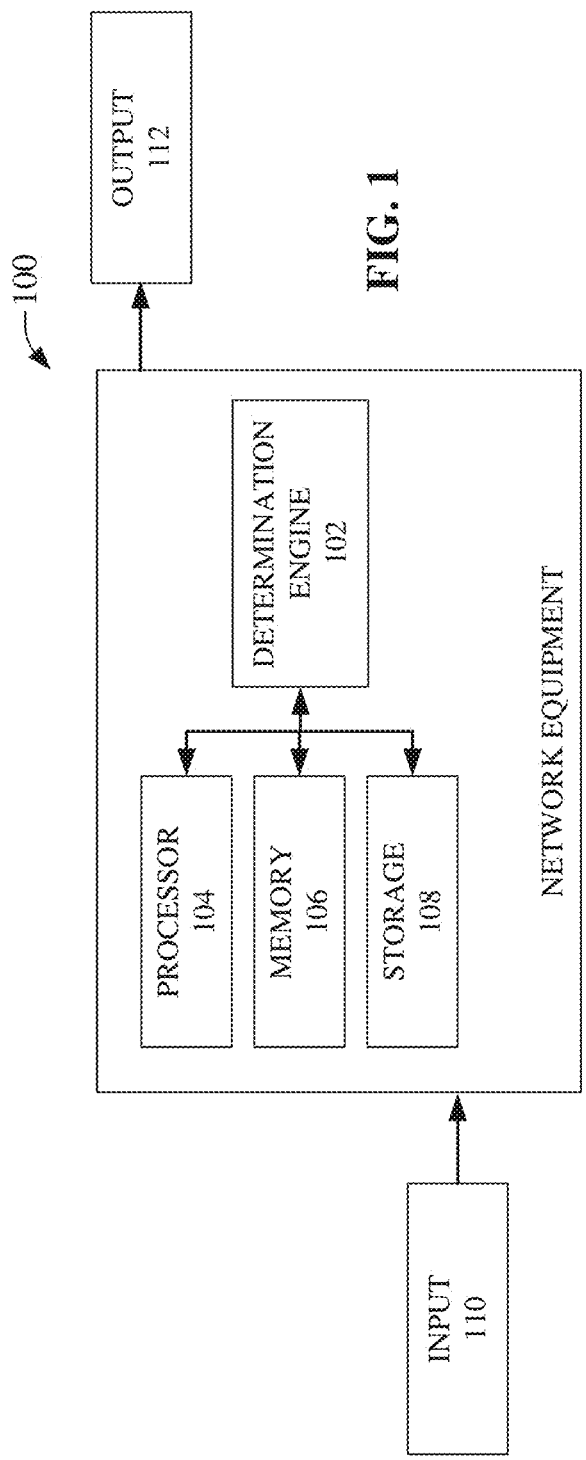
FIG. 1 is an illustration of a system that effectuates and/or facilitates notifying UE of communication transportation functionality and/or facility shifts between the use of a primary wired communication transportation framework and a secondary wireless communication transportation framework, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter, in accordance with various embodiments, provides a system, apparatus, equipment, or device comprising: a processor (and/or one or more additional processors), and a memory (and/or one or more additional memories) that stores executable instructions that, when executed by the processor, facilitate performance of operations. The operations can comprise determining a decrease in a number of data packets flowing through a wireline network interface (e.g., wireline communication transportation framework) over a defined period of time, based on the number of data packets, determining that the wireline network interface is in an inoperable state, based on the wireline network interface being in an inoperable state, generating a notification comprising a data record comprising a field representing a state associated with the wireline network interface; and sending the notification to a user equipment.

Additional operations can comprise: based on the wireline network interface being in the inoperable state, initiating a wireless network interface for use by the user equipment to communicate with a cellular network infrastructure, receiving a data record representing universal plug and play data from core equipment positioned on a cellular network infrastructure, and wherein when the wireline network interface is a first wireline network interface, receiving a data record representing universal plug and play data from core equipment, using the data record to establish a second wireline network interface to a proximate neighbor equipment (e.g., equipment that can typically be proximate to the system).

In accordance with the foregoing, the field representing the state of the wireline network interface can be included in the data record, the field representing the state of the wireline network interface can be represented as flag data, the field representing the state of the wireline network interface can be represented as bit data, the field representing the state of the wireline network interface can be represented as a string of alphanumeric characters, and the field representing the state of the wireline network interface can be represented as semaphore data (e.g., a variable or type of synchronization primitive used to control access to a resource depending on defined conditions).

In accordance with further embodiments, the subject disclosure describes methods and/or processes, comprising a series of acts that, for example, can include: determining, by a device comprising a processor, a decrease in a number of data packets flowing through a wireline network interface over a defined period of time, based on the number of data packets, determining, by the device, that the wireline network interface is failing, generating, by the device, a notification comprising a data record comprising a field representing a state associated with the failing wireline network interface, and sending, by the device, the notification to a user equipment.

In regard to the following, further acts can include: determining, by the device, that the wireline network interface is failing based on a multi-objective optimization analysis that ensures that first groups of first actions are implemented provided that second groups of second actions are not detrimentally affected, determining, by the device, that the wireline network interface is failing based on a cost benefit analysis that weighs a cost of taking an action against a benefit of taking the action and taking the action in response to determining that the benefit associated with taking the action outweighs the cost associated with taking the action, and receiving, by the device, a data record representing universal plug and play data from core equipment situated on a cellular network infrastructure.

Further, the field representing the state of the wireline network interface can be included in the data record, the field representing the state of the wireline network interface can be represented as flag data, the field representing the state of the wireline network interface can be represented as bit data, and the field representing the state of the wireline network interface can be represented as a string of alphanumeric characters.

Additionally, when the wireline network interface is a first wireline network interface, the operations can comprise based on receiving a data record representing universal plug and play data from core equipment, using, by the device, the data record to establish a second wireline network interface to a proximate neighbor equipment.

In accordance with still further embodiments, the subject disclosure describes machine readable media, a computer readable storage devices, or non-transitory machine readable media comprising instructions that, in response to execution, cause a computing system (e.g., apparatus, equipment, devices, groupings of devices, etc.) comprising at least one processor to perform operations. The operations can include: determining a decrease in a number of data packets flowing through a wireline network interface over a defined period of time, based on the number of data packets, determining that the wireline network interface is failing, generating a notification comprising a data record comprising a field representing a state associated with the failing wireline network interface, and sending the notification to a user equipment.

Additional operations can comprise determining that the wireline network interface is failing based on a multi-objective optimization analysis that ensures that first groups of first actions are implemented provided that second groups of second actions are not detrimentally affected, and determining that the wireline network interface is failing based on a cost benefit analysis that weighs a cost of taking an action against a benefit of taking the action and taking the action in response to determining that the benefit associated with taking the action outweighs the cost associated with taking the action.

The subject disclosure in general provides systems and methods for the notification to a user equipment (UE) of the communication transportation framework (wired, wireline, and/or wireless) that is being used by network equipment, such as work from home (WFH) equipment, to effectuate communication, through, for instance, a mobile network operator (MNO) entity's communication infrastructure, with a universe comprising a multiplicity clouds representing the on-demand availability of computer system resources, such as data storage clouds, corporate networking clouds, and the like. Large clouds can often have a plethora of functions distributed over multiple geographic locations, wherein each geographic location can comprise at least one data center.

In a converged wireless/wireline communication transportation environment, a UE can use the secondary wireless communication transportation framework when the primary wireline communication transportation framework is unavailable. When communication transportation framework switches from the primary wireline communication transportation framework to the secondary wireless communication transportation framework occur, the UE generally can have no idea that the communication transportation framework has been switched.

The subject disclosure provides functionalities and facilities that allow a UE to be notified on which communication transportation framework is being used. In this regard, example benefits provided by the subject disclosure are that, if the communication transportation framework switches and the UE is made aware that the UE is now using a wireless communication transportation framework, the UE can, for example, initiate the following processes in order to reduce and/or save wireless utilization, which in turn can save money as a result of one or more of: (1) lower resolution for audio/video playback; (2) delay software updates; or (3) end user entity (e.g., user) notification of the status of using the wireline and/or wireless communication transportation framework.

In converged wireless/wireline communication transportation environments, the cost to put traffic over secondary wireless communication transportation frameworks can be more expensive than using equivalent primary wireline communication transportation frameworks. The benefit of allowing for failover to the secondary wireless communication transportation framework can be appealing to end-users that want seamless connectivity. However, the end-user, without notification, can be unaware of the monetary consequences associated with seamlessly switching from the primary wireline communication transportation framework to the secondary wireless communication transportation framework, and as such, the end-user can receive an expensive bill at the end of the month.

Universal Plug and Play (UPnP) data is a set of networking protocols that permit network devices, such as UE (e.g., personal computers, printers, Internet gateways, Wi-Fi access points, mobile devices, . . . ) to seamlessly discover each other's presence on the network and establish functional network services. The disclosed subject matter extends UPnP data to announce the current state of the wide area network (WAN) interface. If the UPnP data includes an entry, such as field entitled "wireless," then UE attached to the UPnP network, in response to detecting the "wireless" field could change its behavior, for example, by lowering resolution for audio/video playback; delaying software updates; and the provision of end-user notification of the status of using wireline or wireless communication transport frameworks.

A few example benefits associated with implementing the disclosed subject matter can include: optimizing bandwidth heavy applications to better use the secondary wireless communication transportation framework, thereby ensuring that more bandwidth is available for business critical applications; delaying or postponing unnecessary software updates when the UE is using the secondary wireless communication transportation framework rather than the primary wireline communication transportation framework. The result of such an implementation of the disclosed subject matter can include saving money on wireless bills when the user entity is unaware that their wireline communication transportation framework is down, and in response to the user entity being notified that their wireline communication transportation framework is down, the user entity can take appropriate actions to rectify the problem to ensure that their wireline communication transportation framework is restored.

The described embodiments disclose systems and methods for notifying UE of communication transportation functionality and/or facility shifts between the use of a wireline communication transportation framework and use of a wireless communication transportation framework. In effectuating the foregoing, network equipment such as work from home (WFH) equipment can initiate the following actions and/or processes: (a) determine that there are operable communication pathways to a cellular network infrastructure typically maintained by one or more MNOs; (b) determine that the WFH equipment is using a wireline communication transportation framework rather than using a wireless communication transportation framework to communicate with the cellular network infrastructure; (c) predict, detect, and/or determine that there has been, or will be, a failure with the wireline communication transportation framework; (d) in response to predicting and/or detecting that there has been, or will be, a failure in the wireline communication transportation framework being used to communicate with the cellular network infrastructure at large, and based on universal plug and play (UPnP) data that can have been obtained, for instance, from core equipment (e.g., multi-access edge computing (MEC) equipment, self organizing network (SON) equipment, and the like) by WFH equipment, for instance, during establishment procedures effectuated to initiate the one or more communication pathways to the cellular network infrastructure, determine whether there are neighboring network equipment (e.g., internet of things (IoT) equipment, consumer electronic equipment, industrial appliances, . . . ) situated in the general vicinity of the WFH equipment that have operable wireline connection through one or more established communication pathways to the cellular network infrastructure; (e) in response to determining that there are neighboring network equipment that have functional wireline connections to the wider cellular network infrastructure, WFH equipment can generate a notification for each respective and associated UE that is in communication with the wider cellular network infrastructure through the WFH equipment that communication via the wireline communication transportation framework is currently inoperable, and as a consequence, a wireless communication transportation framework is being established with the cellular network infrastructure to ensure a continued and seamless communication pathway to the wider cellular network infrastructure; and (f) WFH equipment can then send the notification to UE, wherein the notification, in addition to the above generated notification, can also comprise, for example, authentication data such as multi-party block chain data, nonce strings, and UPnP data associated, for example, with available neighbor network equipment.

In accordance with additional and/or alternative embodiments, the systems and methods for notifying UE of communication transportation functionality and/or facility shifts between the use of a wireline communication transportation framework and use of a wireless communication transportation framework can include: (1) determining that there are operable communication pathways to a cellular network infrastructure; (2) determining that the WFH equipment is using a wireline communication transportation framework rather than using a wireless communication transportation framework to communicate with the cellular network infrastructure; (3) predicting, detecting, and/or determining that there has been, or will be, a failure with the wireline communication transportation framework; (4) using UPnP data that can have been initially obtained, for instance, from core equipment (e.g., database equipment, multi-access edge computing (MEC) equipment, self organizing network (SON) equipment, radio access network (RAN) intelligent controller (RIC) equipment, and the like) by WFH equipment during an earlier establishment of the wireline communication transportation framework, to determine that there are no neighboring network equipment located proximate to the WFH equipment that have operable wireline connections to the one or more established communication pathways to the cellular network infrastructure; (5) WFH equipment can then generate and convey one or more notifications to UE informing them that the wireline communication transportation framework is unavailable and that communication with the wider cellular network infrastructure is now being effectuated using a wireless communication transportation framework; (6) WFH equipment, in response to determining that there are no neighboring network equipment having operable wireline connections to the cellular network infrastructure, if possible, can use an established wireless communication transportation framework to initiate a search for updated UPnP data associated with possible or likely neighbor network equipment, and based at least in part on retrieved updated UPnP data facilitate the establishment of a wireline communication transportation framework, via the neighbor network equipment to the cellular network infrastructure at large; (7) WFH equipment, having established an operable communication link with the wider cellular network infrastructure via the neighbor network equipment and its wireline communication transportation framework (e.g., a second wireline communication transportation framework), can ensure that the established second wireline communication transportation framework is stable, and based on the stability of the second wireline communication framework operating on the neighbor network equipment, WFH equipment can cause UE attached to WFH equipment to initiate processes (e.g., using generated notification data) to switch from the initial or original wireline communication transportation framework (e.g., first wireline communication transportation framework) that it was originally utilizing to the second wireline communication transportation framework that the WFH equipment has deemed to be in a stable state; and (8) UE based at least on the generated notification data can re-establish communication with the second wireline communication transportation framework established via the neighbor network equipment.

In regard to the foregoing, it should be observed that where WFH equipment is unable to identify, based on UPnP data, that there are viable neighbor network equipment with functional/operational wireline communication transportation frameworks to the wider cellular network infrastructure, UE based at least on the UPnP data comprising a field indicating that there are no available neighbor network equipment capable of hosting a wireline communication transportation framework to the cellular network, UE can, for example, use the wireless communication transportation framework established on the WFH equipment, but initiate one or more processes to: lower resolutions for video and/or audio streaming and playback; delay the downloading and/or installation of software updates; throttle back notifications in regard to unneeded status notifications that are being communicated through the wireless communication transportation framework.

Now with reference to FIG. 1 that illustrates a system 100 (e.g., network equipment representative of WFH equipment/device) that effectuates and/or facilitates notifying UE of communication transportation functionality and/or facility shifts between the use of a primary wired communication transportation framework and a secondary wireless communication transportation framework, in accordance with various embodiments. As illustrated system 100 can comprise determination engine 102 that can be communicatively coupled to processor 104, memory 106, and storage 108. Determination engine 102 can be in communication with processor 104 for facilitating operation of computer and/or machine executable instructions and/or components by determination engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by determination engine 102 to produce one or more useful, concrete, and tangible result, and/or transform one or more articles to different states or things. Further, system 100 can also generate and output the useful, concrete, and tangible results, and/or the transformed one or more articles produced by determination engine 102, as output 112.

In some embodiments, system 100 can be an aerial Internet of Things (IoT) small form factor equipment capable of effective and/or operative communication with a network topology (e.g., cellular network). Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, aerial UE and/or unmanned aerial vehicles (UAVs), orbiting satellites and/or associated aeronautical vehicles, and the like.

System 100 in some embodiments can be a business work from home networking device or apparatus that provides optimized dual link communications for improving productivity and intelligent routing. In additional and/or alternative embodiments, system 100 can provide facilities to ensure secure access to critical business applications and private networks, such as business application clouds, corporate networks, banking solutions networks, and the like. Further, system 100 in further embodiments can perform business traffic prioritization over cellular networks comprising advanced network equipment (e.g., core network equipment implementing advanced networking standards, such as, the fifth generation (5G) new radio (NR) network standard, and/or telecommunication standards promulgated by technical standards organizations such as the third ($3^{rd}$) generation partnership project (3GPP)). In other additional and/or alternative embodiments system 100 can effectuate and facilitate cloud-based security for highly-secure home-based traffic (e.g., network traffic associated with secure corporate network clouds, banking network clouds, business application clouds, . . . ). Further, system 100 can provide a management portal to allow for information technology (IT) technical support personnel to access system 100 on behalf of end users of the WFH device and associated UE to conduct technical support management. Additionally, system 100, typically being a small form factor end user device, can provide plug and play functionalities to allow end users to incorporate system 100 into their at-home network infrastructures with relative ease.

System 100, in some embodiments, can be considered small form factor router equipment or small form factor gateway equipment situated in a residence or a residential environment (e.g., end user house, condominium environment, retirement residences, and the like), in some additional and/alternative embodiments, system 100 can be located in educational, commercial, and/or industrial locations such as university campuses, corporate campuses, industrial/manufacturing shop floors, etc. In some embodiments, system 100 can be a distinct standalone component. In other embodiments, system 100 can be integrated into or within other broadband networking equipment. Generally, system 100 can prioritize corporate communications with corporate network infrastructures and/or business application clouds over general Internet non-corporate/business application communications, and/or Internet gaming infrastructures.

Determination engine 102 in accordance with some embodiment can determine that there are operable communication pathways to a cellular network infrastructure typically maintained by one or more MNOs. For instance, determination engine 102 can determine whether there is a steady flow of data packets being received as input 110 and/or output 112.

In some embodiments, determination engine 102 can further determine that system 100 (e.g., WFH equipment) using a primary wireline communication transportation framework rather than using a secondary wireless communication transportation framework to communicate with the cellular network infrastructure. Additionally, determination engine predict, detect, and/or determine whether there has been, or will be, a failure with the wireline communication transportation framework. In regard to predicting whether or not there will be a failure with regard to the wireline communication transportation framework, determination engine 102 can use artificial intelligence processes, cost benefit analyses, Pareto optimality determinations, machine learning techniques, and/or the use of big datasets and data mining to determine, based on pertinent metric data, first probabilities that the wireline communication transport framework will fail and second probabilities that the wireline communication transportation frame will not fail and thereafter can compare the first and second probabilities to make a decision on whether or not there is a likelihood that the wireline communication transportation framework will fail or will remain stable. Other techniques that determination engine 102 can also use to determine whether or not there will be a likelihood that the wireline communication transportation framework will fail or will remain stable, can include the use of neural networks, fuzzy logic, and the like.

Determination engine 102, in response to predicting and/or detecting that there has been, or will be, a failure in the wireline communication transportation framework being used to communicate with the cellular network infrastructure at large, and/or based on universal plug and play (UPnP) data that can have been obtained, for instance, from core equipment, for instance, during establishment procedures effectuated to initiate the one or more communication pathways to the cellular network infrastructure, can determine whether there are neighboring network equipment situated in the general vicinity of system 100 that have operable wireline connection through one or more established communication pathways to the cellular network infrastructure.

Determination engine 102, in response to determining that there are neighboring network equipment that have functional wireline connections to the wider cellular network infrastructure, can generate a sequence of notifications for UE in communication with the wider cellular network infrastructure through system 100 that communication via the wireline communication transportation framework is currently inoperable, and as a consequence, a wireless communication transportation framework is being established to the cellular network infrastructure to ensure a continued and seamless communication pathway to the wider cellular network infrastructure.

Determination engine 102 can then send the sequence of notifications to UE, wherein the sequence of notifications can comprise, for example, authentication data such as multi-party block chain data, nonce strings to be variously utilized in conjunction with the authentication data, and UPnP data associated, for example, with available neighbor network equipment.

Determination engine 102 in accordance with additional and/or alternative embodiments can use UPnP data that can have been initially obtained, for instance, from core equipment during an earlier establishment of the wireline communication transportation framework, to determine that there are no neighboring network equipment located proximate to the system 100 that have operable wireline connections to the one or more established communication pathways to the cellular network infrastructure. Based on not having identified any neighboring network equipment with an operable wireline transportation framework, determination engine 102 can generate and convey one or more notifications to attached UE informing them that the wireline communication transportation framework is unavailable and that communication with the wider cellular network infrastructure is now being effectuated using a wireless communication transportation framework.

Determination engine 102, in response to determining that there are no neighboring network equipment that have operable wireline connections to the cellular network infrastructure, can use an established wireless communication transportation framework to initiate a search for updated UPnP data associated with possible or likely neighbor network equipment, and based at least in part on retrieved and updated UPnP data facilitate the establishment of a wireline communication transportation framework, via the neighbor network equipment, to the cellular network infrastructure at large.

Determination engine 102 having established an operable communication link with the wider cellular network infrastructure via the neighbor network equipment and its now established wireline communication transportation framework (e.g., a second wireline communication transportation framework), can ensure that the second wireline communication transportation framework is stable, and based on the stability of the second wireline communication framework and cause UE attached to system 100 to initiate processes, based at least on the generated notification data, to switch from the original wireline communication transportation framework (e.g., first wireline communication transportation framework) that it was initially utilizing to the second wireline communication transportation framework that the determination engine 102 has deemed to be in a stable state. Thereafter, attached UE, based at least on the generated notification data, can re-establish communication, through the second wireline communication transportation framework established and the neighbor network equipment, with the wider cellular network infrastructure.

As has been noted earlier, there can be instances where determination engine 102 is unable to identify, based on UPnP data, that there are viable neighbor network equipment with functional/operational wireline communication transportation frameworks to the wider cellular network infrastructure. In such circumstances, UE associated with system 100, based at least on communicated UPnP data comprising a field (e.g., "communication transportation framework in use=wireless|wireline") indicating that there are no available neighbor network equipment capable of hosting a wireline communication transportation framework to the cellular network (e.g., the field can be "communication transportation framework in use=wireless"), can continue to use the wireless communication transportation framework established on system 100 but in order to save costly wireless fees and save money can initiate one or more processes to: lower resolutions for video and/or audio streaming and playback; delay the downloading and/or installation of software updates; throttle back notifications in regard to unneeded status notifications that are being communicated through the wireless communication transportation framework.

In view of the example system(s) described above, example method(s) that can be implemented in accordance with the disclosed subject matter can be better appreciated with reference to the flowcharts and/or illustrative time sequence charts in FIGS. 2-5. For purposes of simplicity of explanation, a example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 2:
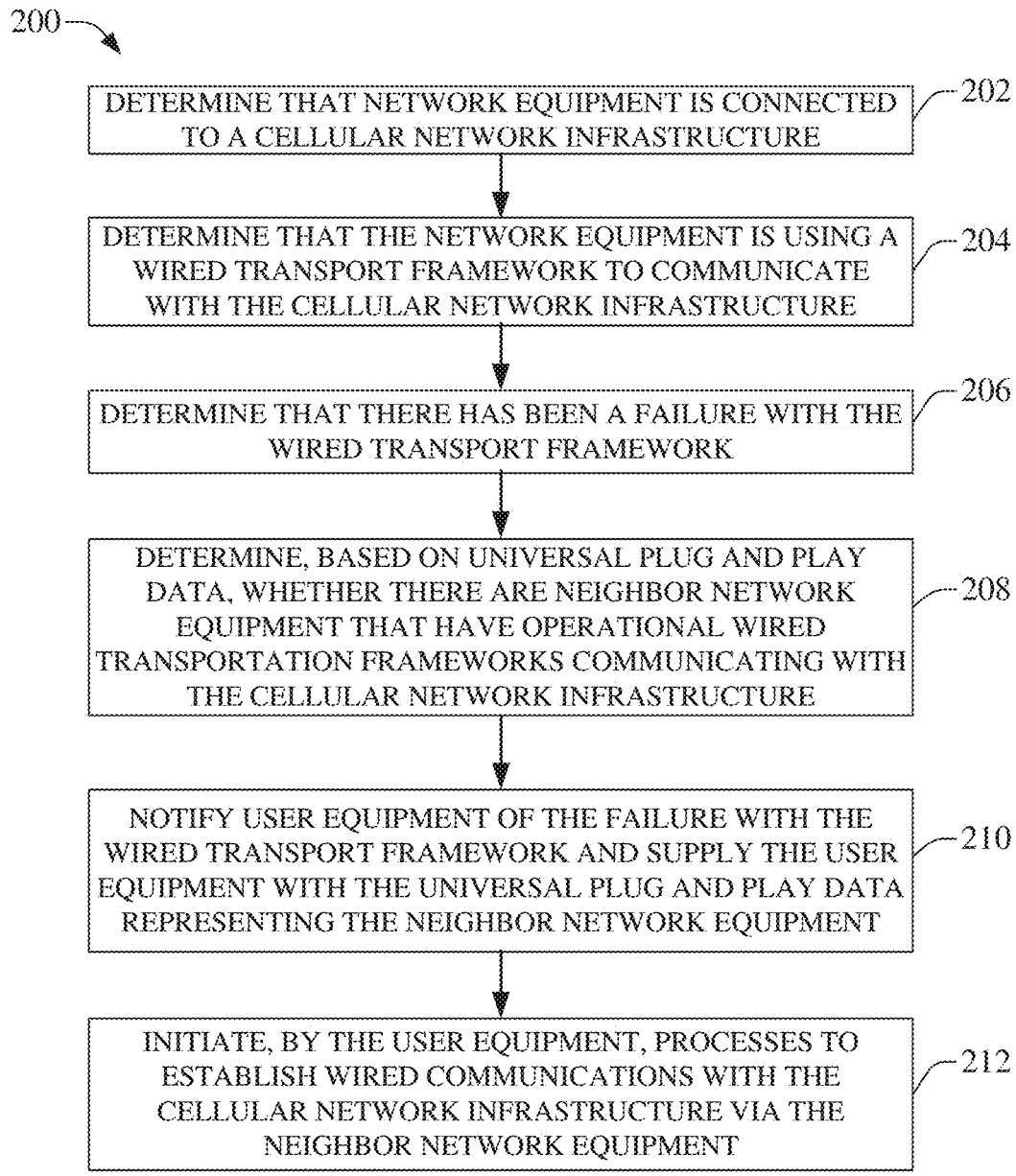
FIG. 2 provides illustration of a flow chart, time sequence chart, or method that can be used to effectuate and/or facilitate notifying a UE of communication transportation functionality and/or facility shifts between the use of a primary wired communication transportation framework and a secondary wireless communication transportation framework, in accordance with aspects of the subject disclosure.

FIG. 2 illustrates a flow chart or method 200 that can be used to effectuate and/or facilitate notifying UE associated with WFH equipment (e.g., system 100) of communication transportation functionality and/or facility shifts between the use of a primary wired communication transportation framework and a secondary wireless communication transportation framework, in accordance with various embodiments. Method 200 can commence at act 202 whereupon WFH equipment can determine whether or not there are operable communication pathways to a cellular network infrastructure typically maintained by one or more MNOs.

At act 204 WFH equipment can determine whether or not it is using a wireline communication transportation framework rather than using a wireless communication transportation framework to communicate with the cellular network infrastructure. This can be performed by determining the number of data packets that are flowing through a communication transportation framework (e.g., a wireline communication transportation framework or a wireless communication transportation framework) within a defined or determinable period of time.

At act 206 WFH equipment can predict, detect, and/or determine whether there has been, or will be, a failure with the wireline communication transportation framework. In regard to the prediction, detection, and/or determination as to whether or not there has been, or will be, a failure with the wireline communication transportation framework, WFH equipment can use classification schemes and/or systems (e.g., support vector machines, neural networks, expert systems, bayesian belief networks, fuzzy logic, and data fusion engines) to infer, predict, detect, and/or determine that a failure with the wireline communication transportation framework has occurred, and/or within a defined period of time will occur.

Further at act 206 WFH equipment can use of artificial intelligence technologies, neural networking architectures, collaborative filtering processes, machine learning techniques, and/or big data mining functionalities wherein, for example, probabilistic determinations based at least in part on cost benefit analyses (e.g., the cost of taking a particular action is weighed against the benefit of taking the particular action, wherein in response to determining that the benefit associated with the action outweighs the cost associated with the action, the action is identified as an action worthy of consideration and implementation) can be undertaken. In additional and/or alternative other embodiments, artificial intelligence technologies, neural networking architectures, collaborative filtering processes, machine learning techniques, Bayesian belief systems, big data mining and data analytic functionalities, and the like, can be employed, wherein, for example, multi-objective optimization (e.g., Pareto optimization) can be used to determine whether or not an action should be initiated and implemented. Multi-objective optimization can ensure that first actions or groups of first actions can only be implemented provided that other second actions or groups of other second actions will not be detrimentally affected.

At act 208, in response to inferring, predicting, and/or detecting that there has been, or will be, a failure in the wireline communication transportation framework being used to communicate with the cellular network infrastructure at large, and based on universal plug and play (UPnP) data that can have been obtained earlier, for instance, from core equipment by WFH equipment, for instance, during initial establishment procedures effectuated to initiate the one or more communication pathways to the cellular network infrastructure, WFH equipment can determine whether or not there are neighboring network equipment situated in the general vicinity of the WFH equipment that have operable wireline connection through one or more established communication pathways to the cellular network infrastructure.

At act 210, in response to determining that there are neighboring network equipment that have functional wireline connections to the wider cellular network infrastructure, WFH equipment can generate a notification for each associated UE that is in communication with the wider cellular network infrastructure through the WFH equipment that communication via the wireline communication transportation framework facilitated by the WFH equipment is currently inoperable, and as a consequence, a wireless communication transportation framework is being established with the cellular network infrastructure to ensure a continued and seamless communication pathway to the wider cellular network infrastructure.

At act 212 WFH equipment can then convey the notification to UE, wherein the notification, in addition to the above generated notification, can also comprise, for example, authentication data such as multi-party block chain data, nonce strings, and UPnP data associated, for example, with available neighbor network equipment.

In regard to multi-party block chain data, a distributed database—a block chain—contains transactions used to register {value, key} pairs and optional extra flags. For example, for a given transaction the distributed database registers the id of a node j and its corresponding public key $k^P_j$ as the pair $\{id_j, k^P_j\}$. These transactions can be originated by MNO entity equipment which can sign or encrypt the pair with one of its multiplicity/plurality of secret/private cryptographic keys. In turn one of the one or more public cryptographic keys associated with the MNO entity equipment can be used to verify the pairing and validate that the pairing was created and inserted into the distributed database by, for example, the MNO entity equipment.

Figure 3:
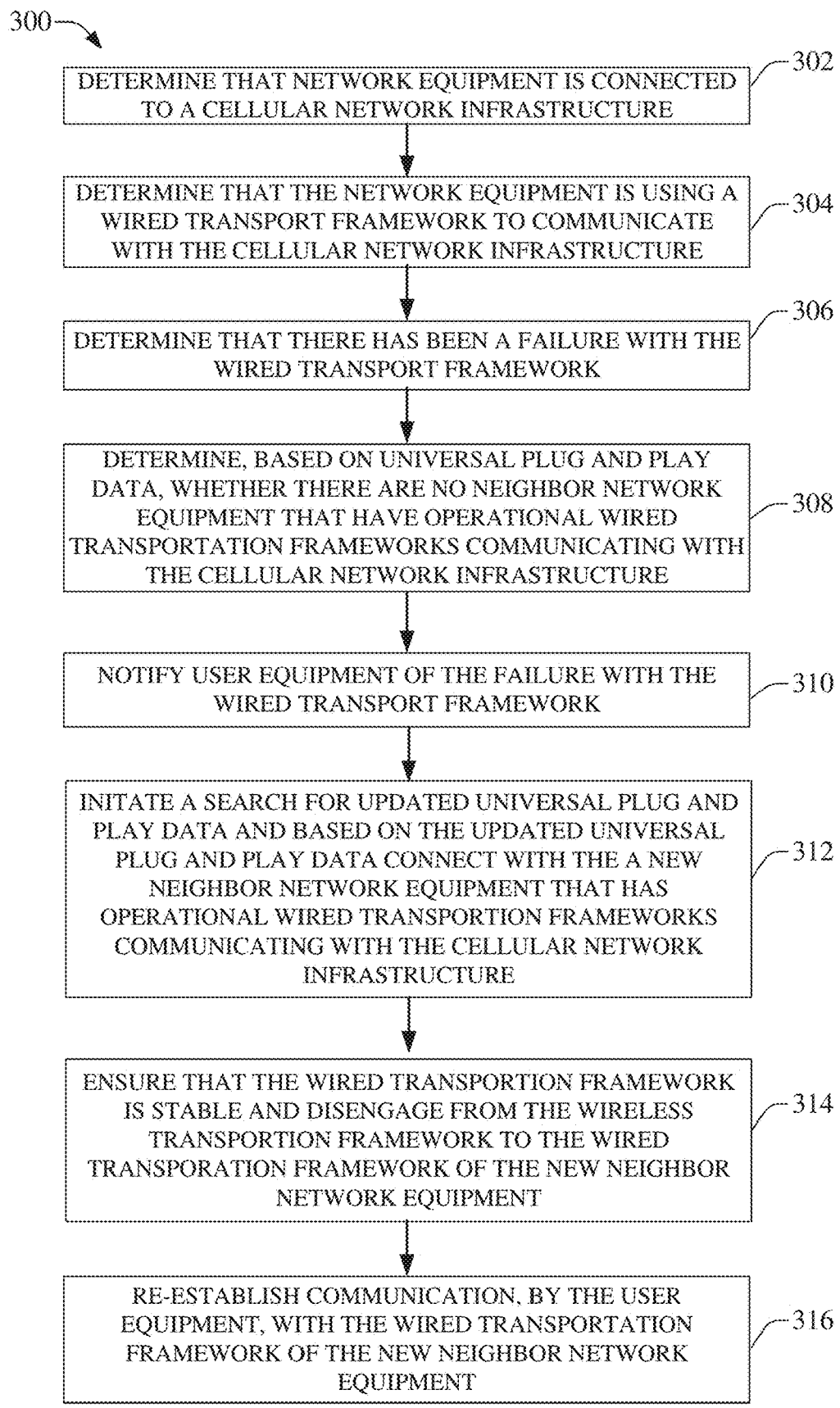
FIG. 3 provides illustration of a flow chart, time sequence chart, or method that can be used to effectuate and/or facilitate notifying a UE of communication transportation functionality and/or facility shifts between the use of a primary wired communication transportation framework and a secondary wireless communication transportation framework, in accordance with aspects of the subject disclosure.

FIG. 3 depicts a further flow chart or method 300 that can be employed to effectuate and/or facilitate notifying UE associated with WFH equipment (e.g., system 100) of communication transportation functionality and/or facility shifts between the use of a primary wired communication transportation framework and a secondary wireless communication transportation framework, in accordance with various embodiments. Method 300 can begin at act 302 where WFH equipment can determine that there are operable communication pathways to a cellular network infrastructure.

At act 304, a determination can be made as to whether or not the WFH equipment is using a wireline communication transportation framework or a wireless communication transportation framework to communicate with the cellular network infrastructure. At act 306, WFH equipment (and/or a multiplicity of equipment situated within the MNOs core network infrastructure—SON equipment, MEC equipment, RIC equipment, dedicated task infrastructure equipment) can infer, predict, detect, and/or determine whether there has been, or will be, a failure with the wireline communication transportation framework. At act 308, UPnP data that can have been initially obtained, for instance, from core equipment by WFH equipment during an earlier establishment processes can be employed to determine that there are no neighboring network equipment located proximate to the WFH equipment that have operable wireline connections to the to the cellular network infrastructure. At act 310, WFH equipment can generate and convey one or more notifications to UE informing them that the primary wireline communication transportation framework is unavailable and that communication with the wider cellular network infrastructure is now being effectuated using a secondary wireless communication transportation framework. At act 312, WFH equipment, in response to determining that there are no neighboring network equipment having operable wireline connections to the cellular network infrastructure, if possible, can use an established secondary wireless communication transportation framework to initiate a search for updated UPnP data associated with possible or likely neighbor network equipment, and based at least in part on retrieved updated UPnP data facilitate the establishment of a wireline communication transportation framework, via the neighbor network equipment to the cellular network infrastructure at large. At act 314, WFH equipment, having established an operable communication link with the wider cellular network infrastructure via the neighbor network equipment and its established wireline communication transportation framework (e.g., a second wireline communication transportation framework), can ensure that the established second wireline communication transportation framework is stable, and based on the stability of the second wireline communication framework operating on the neighbor network equipment, WFH equipment can cause UE attached to WFH equipment to initiate processes (e.g., using generated notification data) to switch from the initial or original wireline communication transportation framework (e.g., first wireline communication transportation framework) that it was originally utilizing to the second wireline communication transportation framework that the WFH equipment has deemed to be in a stable state. At act 316, UE based at least on the generated notification data can re-establish communication with the second wireline communication transportation framework established via the neighbor network equipment.

As noted earlier, where WFH equipment is unable to identify, based on UPnP data, that there are viable neighbor network equipment with functional/operational wireline communication transportation frameworks to the wider cellular network infrastructure, UE based at least on the UPnP data (e.g., included in the notification from the WFH equipment) comprising a field indicating that there are no available neighbor network equipment capable of hosting a wireline communication transportation framework to the cellular network, UE can, for example, continue to use the wireless communication transportation framework established on the WFH equipment, but initiate one or more processes to: lower resolutions for video and/or audio streaming and playback; delay the downloading and/or installation of software updates; throttle back notifications in regard to unneeded status notifications that are being communicated through the wireless communication transportation framework.

Figure 4:
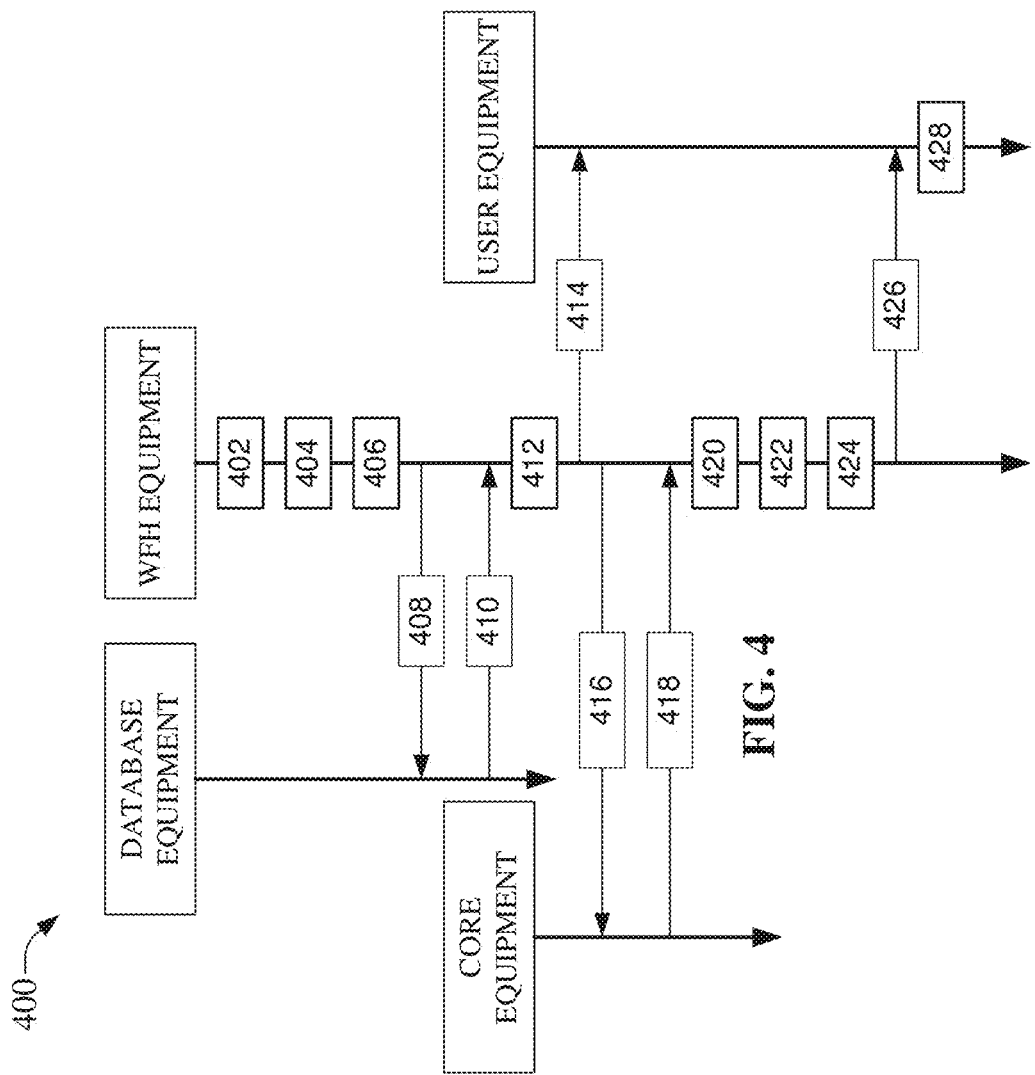
FIG. 4 provides illustration of a flow chart, time sequence chart, or method that can be used to effectuate and/or facilitate notifying a UE of communication transportation functionality and/or facility shifts between the use of a primary wired communication transportation framework and a secondary wireless communication transportation framework, in accordance with aspects of the subject disclosure.

With reference to FIG. 4 that illustrates a flow chart, time sequence chart, or method 400 that can be used to effectuate and/or facilitate notifying UE associated with WFH equipment (e.g., system 100) of communication transportation functionality and/or facility shifts between the use of a primary wired communication transportation framework and a secondary wireless communication transportation framework, in accordance with various embodiments Time sequence 400 can begin at act 402 where WFH equipment can determine that there are operable communication pathways to a cellular network infrastructure. At act 404, a determination can be made as to whether or not the WFH equipment is using a wireline communication transportation framework or a wireless communication transportation framework to communicate with the cellular network infrastructure. At act 406, WFH equipment can infer, predict, detect, and/or determine whether there has been, or will be, a failure with the wireline communication transportation framework.

At act 408, a request for UPnP data can be transmitted by WFH equipment to database equipment of a group of database equipment (e.g., the database equipment of the group of database equipment can be situated within a MNOs core infrastructure). At act 410, the database equipment of the group of database equipment can respond with the requested UPnP data. In regard to obtaining the UPnP data, in some instances, the UPnP data can be pushed over the MNOs core infrastructure at defined time periods, thus in some embodiments WFH equipment need not solicit the UPnP data, but can rather wait for a defined time period before there is an automatic delivery of the UPnP data (e.g., updated UPnP data).

At acts 412 and 414, WFH equipment can generate and convey one or more notifications to UE informing them that the primary wireline communication transportation framework is unavailable and that communication with the wider cellular network infrastructure is now being effectuated using a secondary wireless communication transportation framework.

At act 416, WFH equipment, in response to determining that there are no neighboring network equipment having operable wireline connections to the cellular network infrastructure, if possible, can use an established secondary wireless communication transportation framework to initiate a search of core equipment for updated UPnP data associated with possible or likely neighbor network equipment, and, at act 418, based at least in part on retrieved updated UPnP data facilitate the establishment of a wireline communication transportation framework, via the neighbor network equipment to the cellular network infrastructure at large.

At act 420, WFH equipment, having established an operable communication link with the wider cellular network infrastructure via the neighbor network equipment and its established wireline communication transportation framework (e.g., a second wireline communication transportation framework), can ensure that the established second wireline communication transportation framework is in a stable state. At act 422, WFH equipment based on the stability of the second wireline communication framework operating on the neighbor network equipment, initiate processes to disengage from the initial or original wireline communication transportation framework (e.g., first wireline communication transportation framework) that it was originally utilizing and, at act 424, engage with the second wireline communication transportation framework that the WFH equipment has deemed to be in a stable state. At act 426, a notification can be conveyed to attached UE regarding the switch from use of the first wireline communication transportation framework to the second wireline communication transportation framework (e.g., the second wireline communication transportation framework being using functionalities and facilities provided by the neighbor network equipment). At act 428, attached UE, based at least on the notification data, can re-establish communication with the core network infrastructure through the second wireline communication transportation framework established via the neighbor network equipment.

Figure 5:
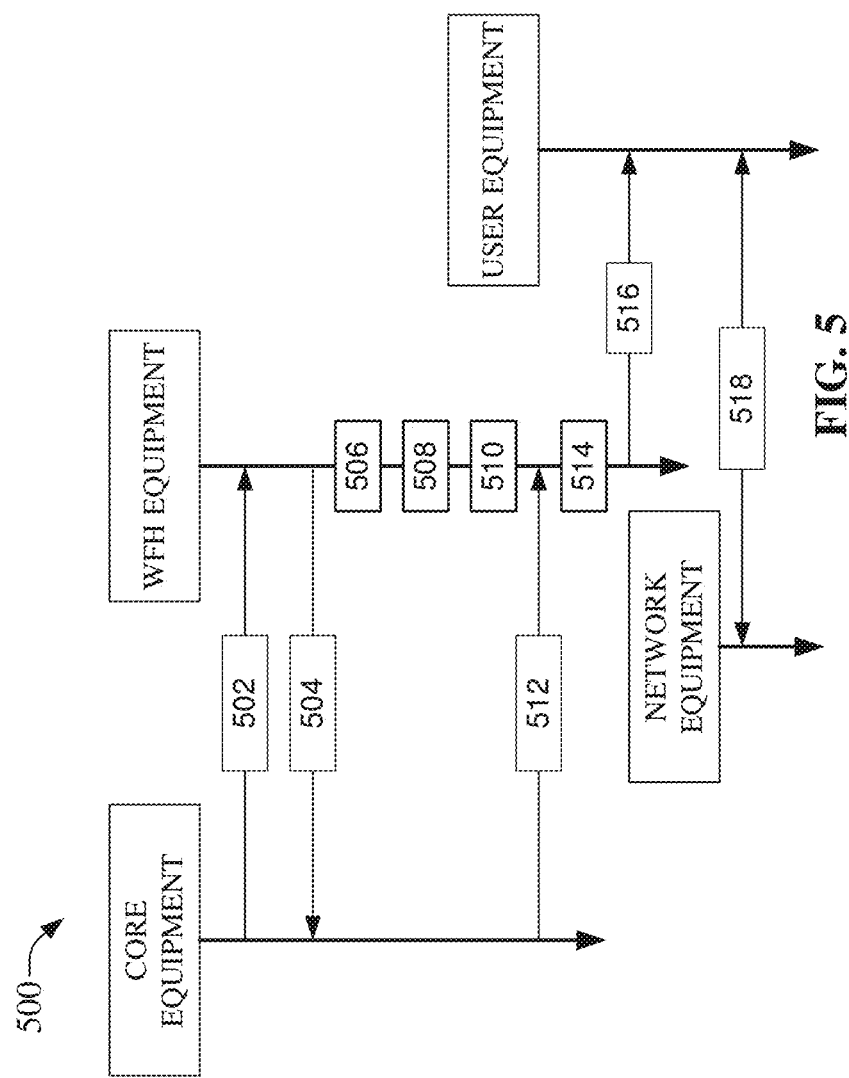
FIG. 5 provides illustration of a flow chart, time sequence chart, or method that can be used to effectuate and/or facilitate notifying a UE of communication transportation functionality and/or facility shifts between the use of a primary wired communication transportation framework and a secondary wireless communication transportation framework, in accordance with aspects of the subject disclosure.

FIG. 5 illustrates a flow chart, time sequence chart, or method 500 that can be used to effectuate and/or facilitate notifying UE associated with WFH equipment (e.g., system 100) of communication transportation functionality and/or facility shifts between the use of a primary wired communication transportation framework and a secondary wireless communication transportation framework, in accordance with various embodiments |Time sequence 500 can being at act 502 whereat WFH equipment can receive, from core equipment, various data comprising, for example, internet protocol (IP) address data, initial UPnP data, and similar establishment data. At act 504, based at least in part on the data received from core equipment, WFH equipment can determine whether or not there are operable communication pathways to core equipment representative of the cellular network infrastructure maintained by one or more MNOs.

At act 506, WFH equipment can determine whether or not it is using a wireline communication transportation framework rather than using a wireless communication transportation framework to communicate with the cellular network infrastructure. For instance, WFH equipment can use key performance indicator values to determine whether or not a wireline communication transportation framework rather than a wireless communication transportation framework is being used to communicate with the cellular network infrastructure.

At act 508, WFH equipment can predict, detect, and/or determine whether there has been, or will be, a failure with the wireline communication transportation framework. As noted earlier, prediction, detection, and/or determination as to whether or not there has been, or will be, a failure with the wireline communication transportation framework, can be performed using classification schemes and/or systems, such as support vector machines (SVMs), neural networks, expert systems, bayesian belief networks, fuzzy logic, and data fusion engines) to infer, predict, detect, and/or determine that a failure with the wireline communication transportation framework has occurred, and/or within a defined period of time will occur. Inferences, predictions, detection, and/or determinations can also be performed using artificial intelligence technologies, neural networking architectures, collaborative filtering processes, machine learning techniques, and/or big data mining functionalities wherein, for example, probabilistic determinations based at least in part on cost benefit analyses, wherein the costs associated with taking particular actions are weighed against the benefits associated with taking the particular actions, and wherein in response to determining that the benefits associated with the actions outweigh (even marginally) the costs associated with the actions, the actions are identified as actions worthy of consideration and implementation and can be undertaken. In additional and/or alternative other embodiments, artificial intelligence technologies, neural networking architectures, collaborative filtering processes, machine learning techniques, bayesian belief systems, big data mining and data analytic functionalities, and the like, can be employed, wherein, for example, multi-objective optimization (e.g., Pareto optimization) can be used to determine whether or not an action should be initiated and implemented. Multi-objective optimization can ensure that first actions or groups of first actions can only be implemented provided that other second actions or groups of other second actions will not be detrimentally affected.

At act 510, in response to inferring, predicting, and/or detecting that there has been, or will be, a failure in the wireline communication transportation framework being used to communicate with the cellular network infrastructure at large, and based on initial universal plug and play (UPnP) data that can have been obtained earlier from core equipment, WFH equipment can determine whether or not there are neighboring network equipment situated in the general vicinity of the WFH equipment that have operable wireline connections to the cellular network infrastructure.

At act 512, WFH equipment can obtain additional updated UPnP data from core equipment. In some instances the core equipment can push the additional updated UPnP data on a periodic basis (e.g., a defined or definable time intervals). In other instances the core equipment can push the additional updated UPnP data on an as needed basis (e.g., WFH equipment solicits core equipment to send the additional UPnP data). In other instances, core equipment can push the additional updated UPnP data in response to determining that a possible neighboring network equipment with available wireline communication transportation framework has come online.

At act 514, in response to determining that there are neighboring network equipment that have functional wireline connections to the wider cellular network infrastructure, WFH equipment can generate a notification for each associated UE that is in communication with the wider cellular network infrastructure through the facilities and/or functionalities provided by the WFH equipment that communication via the wireline communication transportation framework is not currently available, and that a wireless communication transportation framework is has been established with the cellular network infrastructure to ensure a continued and seamless communication pathway to the wider cellular network infrastructure.

At act 516, WFH equipment can then convey the notification to attached UE, wherein the notification, in addition to the above generated notification, can also comprise, for example, authentication data such as multi-party block chain data, nonce strings, and UPnP data associated, for example, with available neighbor network equipment. Thereafter, attached UE, at act 518 can establish communication to the wider cellular network infrastructure using the wireline communication transportation framework established using the neighbor network equipment.

In regard to the foregoing disclosure, it should be noted that core network equipment, such as MEC equipment, SON equipment, and the like can collect key performance indicator (KPI) values. Example KPI values can include: values associated with reference signal received power (RSRP) measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, distance measurement values (e.g., determined based on global positioning satellite (GPS) data, geo-location data, geo-tag data, or other such relevant positioning data) indicating distances between UE, WFH equipment, and/or various core equipment, distance measurement values indicating distances between UE and respective neighboring network equipment, or other similarly appropriate values. KPI values can be values that can have been periodically returned within measurement reports by WFH equipment, neighbor network equipment, and/or UE extant within the control and/or coverage ambit associated with core equipment and/or similar network equipment.

Figure 6:
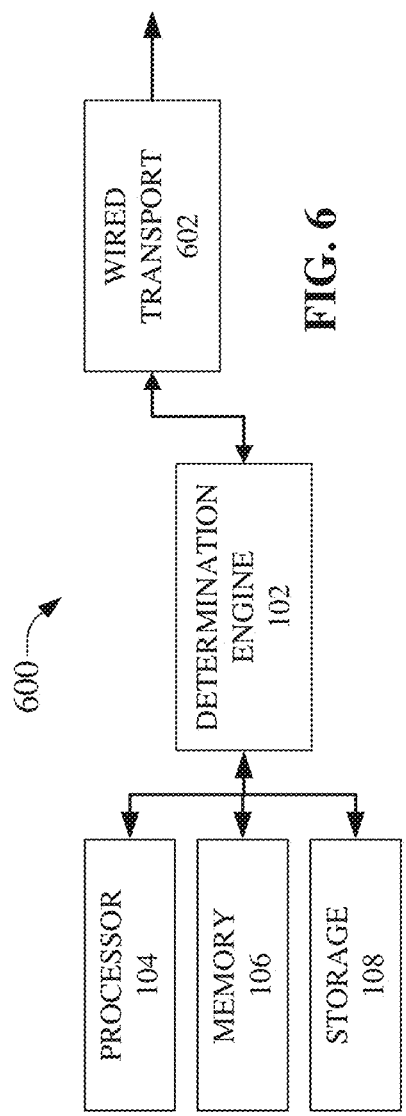
FIG. 6 provides further depiction of a system that effectuates and/or facilitates notifying UE of communication transportation functionality and/or facility shifts between the use of a primary wired communication transportation framework and a secondary wireless communication transportation framework, in accordance with aspects of the subject disclosure.

FIG. 6 is a further illustration of system 100 (now represented as system 600) that effectuates and/or facilitates notifying UE of communication transportation functionality and/or facility shifts between the use of a primary wired communication transportation framework and a secondary wireless communication transportation framework, in accordance with various embodiments. As depicted determination engine 102 is using wired transport 602 (e.g., a wireline communication transportation framework) to communicate with the wider cellular network infrastructure associated with a MNO entity. The wired transport 602 can be the default transport that system 600 can employ to provide operable communications with the cellular network infrastructure, as such within this disclosure it can be referred to as a first wireline communication transportation framework, an initial wireline communication transportation framework, and/or a primary wireline communication transportation framework.

Figure 7:
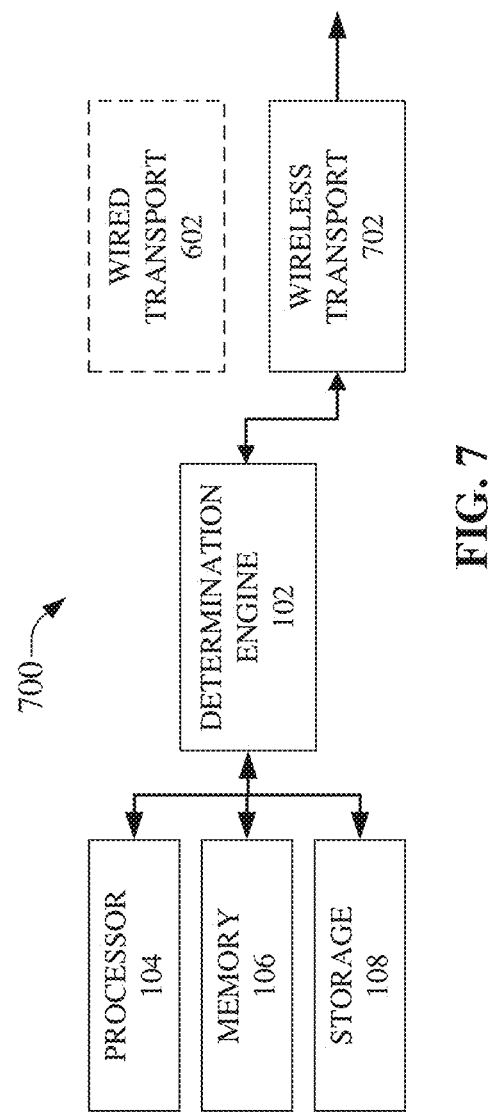
FIG. 7 provides yet further depiction of a system that effectuates and/or facilitates notifying UE of communication transportation functionality and/or facility shifts between the use of a primary wired communication transportation framework and a secondary wireless communication transportation framework, in accordance with aspects of the subject disclosure.

FIG. 7 is a further illustration of system 100 (now represented as system 700) that effectuates and/or facilitates notifying UE of communication transportation functionality and/or facility shifts between the use of a primary wired communication transportation framework and a secondary wireless communication transportation framework, in accordance with various embodiments. As depicted determination engine 102 is using wireless transport 702 (e.g., a wireless communication transportation framework), rather than wired transport 602 to communicate with the wider cellular network infrastructure associated with a MNO entity. The wireless transport 702 can be a backup secondary transport that system 700 can employ to provide wireless communications with the cellular network infrastructure. As such, within this disclosure it can be referred to as a second wireless communication transportation framework and/or a secondary wireless communication transportation framework. Further the wireless transport 702 is generally not the preferred communication transportation framework to be used on a continuing basis because use of wireless communication can be extremely expensive to end users, especially to end users with limited wireless plans.

Figure 8:
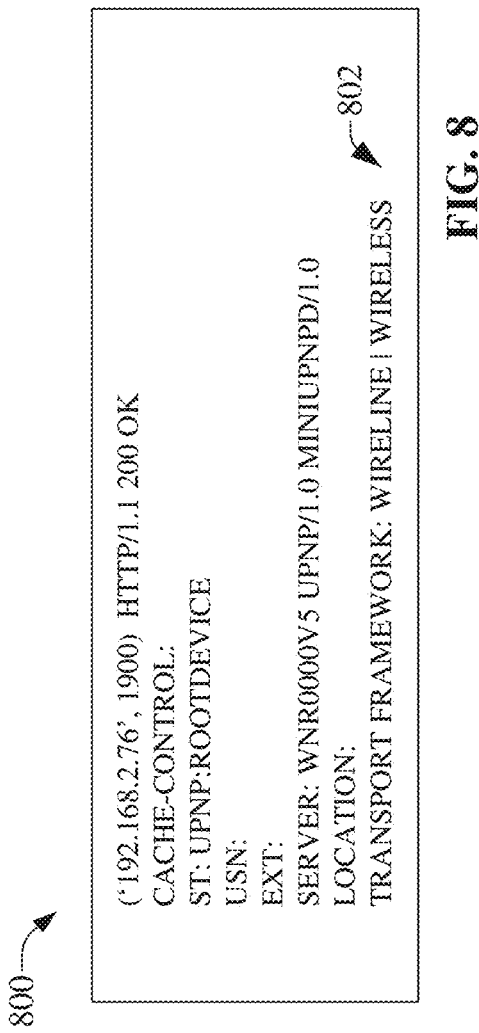
FIG. 8 depicts an example universal plug and play (UPnP) record that can be used, in accordance with aspects of the subject disclosure.

FIG. 8 illustrates an example UPnP data record 800 in accordance with various embodiments. As depicted the UPnP data record 800 can include a field 802 representative of whether or not the communication transportation framework being currently used is a wireline communication transportation framework or a wireless communication transportation framework. At the current time, UPnP data records typically do not include a field, such as field 802, representative of whether or not the communication transportation framework being currently used is a wireline communication transportation framework or a wireless communication transportation framework.

Figure 9:
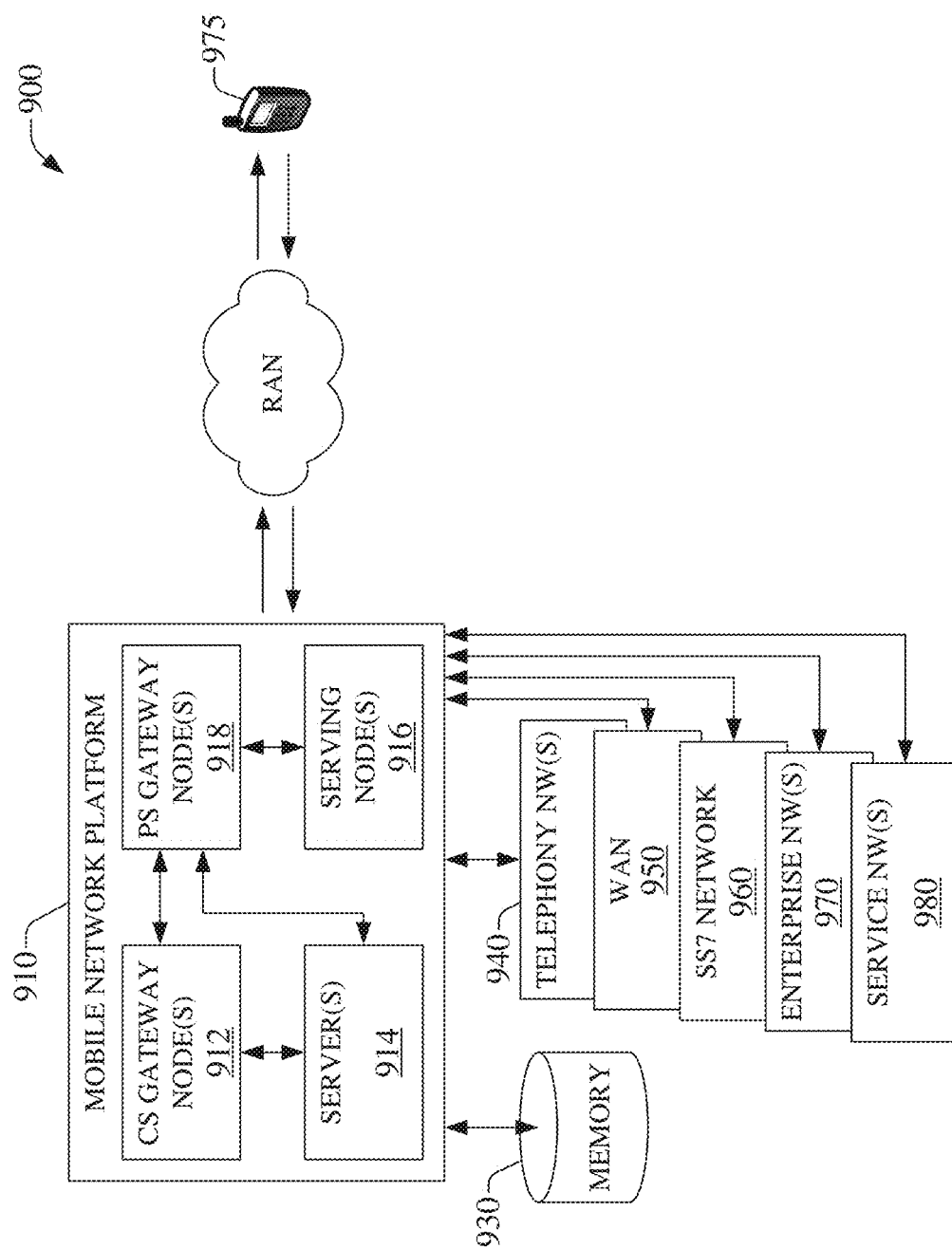
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
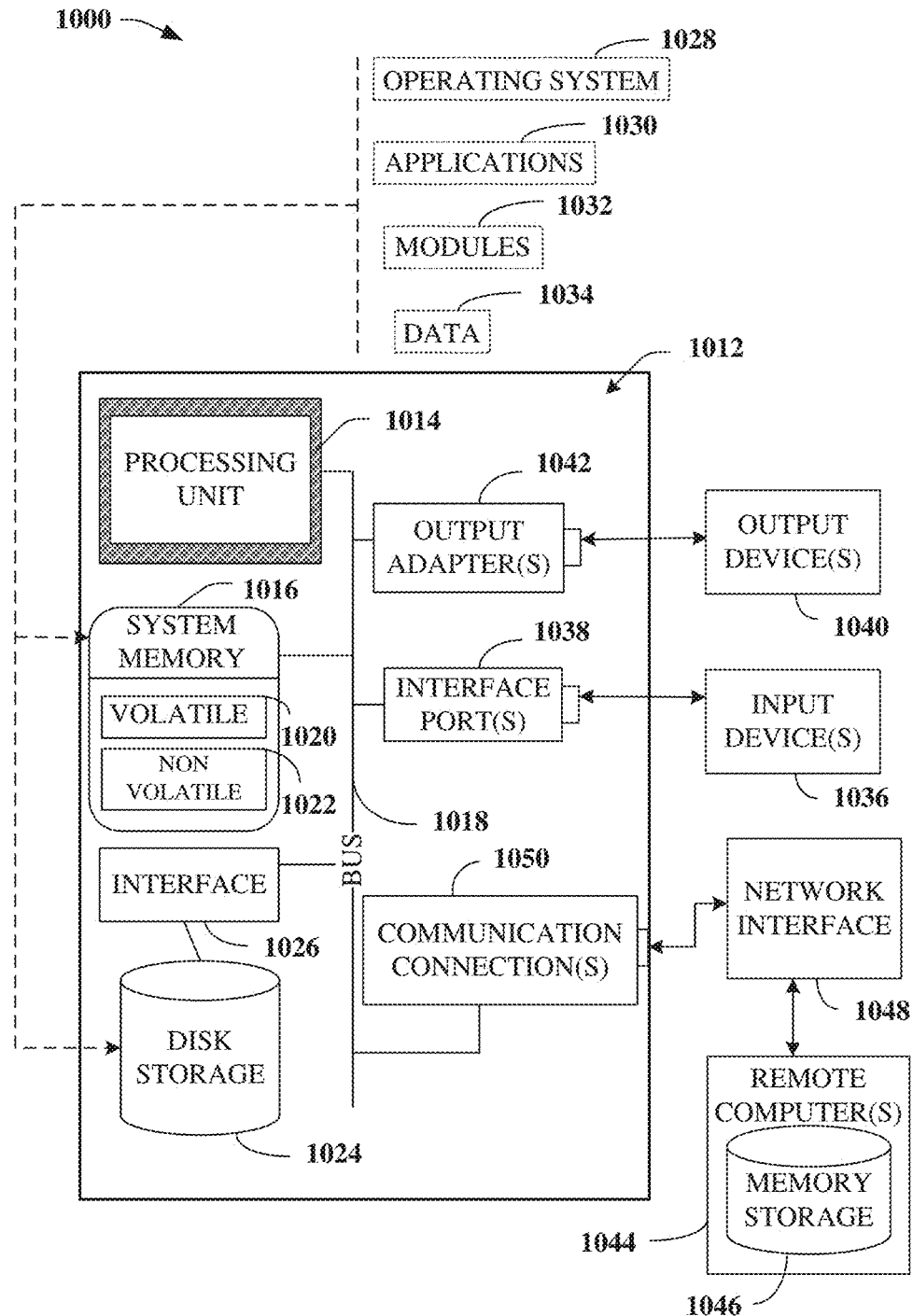
FIG. 10 illustrates a block diagram of a computing system operable to execute the disclosed example embodiments.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below).

Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute one or more parts of one or more of the disclosed example embodiments. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of embodiments illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
   a processor; and
   a memory that stores instructions that, when executed by the processor, facilitates performance of operations, comprising:
   determining a decrease in a number of data packets flowing via a first wireline network interface over a defined period of time;
   based on the number of data packets, determining that the first wireline network interface is in an inoperable state;
   based on the first wireline network interface being determined to be in the inoperable state, generating a notification comprising a data record comprising a field representing a state associated with the first wireline network interface;
   sending the notification to a user equipment, wherein the notification facilitates an initiation by the user equipment of a lower video playback resolution;
   determining that a proximate neighbor equipment that neighbors the system does not have an operable wireline connection to a network;
   in response to determining the proximate neighbor equipment does not have the operable wireline connection to the network, receiving a data record representing universal plug and play data from core equipment; and
   using the data record representing the universal plug and play data, facilitating establishment of a second wireline network interface from the network to the proximate neighbor equipment.

2. The system of claim 1, wherein the operations further comprise based on the first wireline network interface being determined to be in the inoperable state, initiating a wireless network interface for use by the user equipment to communicate with a cellular network infrastructure.

3. The system of claim 1, wherein the core equipment is positioned in a cellular network infrastructure to which the user equipment is authorized to connect.

4. The system of claim 3, wherein the field representing the state of the first wireline network interface is included in the data record.

5. The system of claim 1, wherein the field representing the state of the first wireline network interface is represented as flag data.

6. The system of claim 1, wherein the field representing the state of the first wireline network interface is represented as bit data.

7. The system of claim 1, wherein the field representing the state of the first wireline network interface is represented as a string of alphanumeric characters.

8. The system of claim 1, wherein the notification includes authentication data including at least one of the following associated with the proximate neighboring equipment: a multi-party blockchain data, or a nonce string.

9. A method, comprising:
   determining, by a device comprising a processor, a decrease in a number of data packets flowing through a first wireline network interface over a defined period of time;
   based on the number of data packets, determining, by the device, that the first wireline network interface is failing;
   generating, by the device, a notification comprising a data record comprising a field representing a state associated with the first wireline network interface that is failing; and
   sending, by the device, the notification to a user equipment, wherein the notification facilitates an initiation by the user equipment of a lower audio playback resolution,
   determining that a proximate neighbor equipment that neighbors the device does not have an operable wireline connection to a network;

in response to determining the proximate neighbor equipment does not have the operable wireline connection to the network, receiving a data record representing universal plug and play data from core equipment; and using the data record representing the universal plug and play data, facilitating establishment of a second wireline network interface from the network to the proximate neighbor equipment.

10. The method of claim 9, wherein the determining that the first wireline network interface is failing comprises determining that the first wireline network interface is failing further based on a multi-objective optimization analysis that ensures that first groups of first actions are implemented provided that second groups of second actions are not detrimentally affected.

11. The method of claim 9, wherein the determining that the first wireline network interface is failing comprises determining that the first wireline network interface is failing based on a cost benefit analysis that weighs a cost of taking an action with respect to a benefit of taking the action, and further comprising:

taking, by the device, the action in response to determining that the benefit associated with taking the action outweighs the cost associated with taking the action.

12. The method of claim 9, wherein the field representing the state of the first wireline network interface is included in the data record.

13. The method of claim 9, wherein the field representing the state of the first wireline network interface is represented as flag data.

14. The method of claim 9, wherein the field representing the state of the first wireline network interface is represented as bit data.

15. The method of claim 9, wherein the field representing the state of the first wireline network interface is represented as a string of alphanumeric characters.

16. The method of claim 9, wherein the first wireline network interface is a first wireline network interface, and further comprising, based on receiving a data record representing universal plug and play data from core equipment that is part of a communication network, using, by the device, the data record to establish a second wireline network interface to a proximate neighbor equipment that is part of the communication network and is determined to be proximate to the core equipment.

17. The method of claim 9, wherein the notification includes authentication data including at least one of the following associated with the proximate neighbor equipment: a multi-party blockchain data, or a nonce string.

18. A non-transitory machine-readable medium, comprising executable instructions that, when executed by a processor, facilitate performance of operations, comprising:

determining a decrease in a number of data packets flowing through a first wireline network interface over a defined period of time;

based on the number of data packets, determining that the first wireline network interface is failing;

generating a notification comprising a data record comprising a field representing a state associated with the first wireline network interface that is determined to be failing;

sending the notification to a user equipment, wherein the notification facilitates a delay by the user equipment of a software update;

determining that a proximate neighbor equipment does not have an operable wireline connection to a network;

in response to determining the proximate neighbor equipment does not have the operable wireline connection to the network, receiving a data record representing universal plug and play data from core equipment; and using the data record representing the universal plug and play data, facilitating establishment of a second wireline network interface from the network to the proximate neighbor equipment.

19. The non-transitory machine-readable medium of claim 18, wherein the determining that the first wireline network interface is failing comprises determining that the first wireline network interface is failing further based on a multi-objective optimization analysis that ensures that first groups of first actions are implemented provided that second groups of second actions remain operational.

20. The non-transitory machine-readable medium of claim 18, wherein the determining that the first wireline network interface is failing comprises determining that the wireline network interface is failing further based on a cost benefit analysis that weighs a cost of taking an action against a benefit of taking the action, and wherein the operations further comprise causing the action to be performed in response to determining that the benefit associated with taking the action outweighs the cost associated with taking the action.

* * * * *